(12) United States Patent
Hicks et al.

(10) Patent No.: US 7,417,953 B2
(45) Date of Patent: Aug. 26, 2008

(54) PORT RE-ENABLING BY MONITORING LINK STATUS

(75) Inventors: Timothy Hicks, Newbury Park, CA (US); Phil Ghang, Calabasas, CA (US); Jagjeet Bhatia, Simi Valley, CA (US)

(73) Assignee: Alcatel Lucent, Paris (FR)

( * ) Notice: Subject to any disclaimer, the term of this patent is extended or adjusted under 35 U.S.C. 154(b) by 611 days.

(21) Appl. No.: 11/028,351

(22) Filed: Dec. 30, 2004

(65) Prior Publication Data

US 2006/0165002 A1  Jul. 27, 2006

Related U.S. Application Data

(60) Provisional application No. 60/624,416, filed on Nov. 1, 2004.

(51) Int. Cl.
 *H04L 12/58* (2006.01)
(52) U.S. Cl. .................... 370/235; 370/230; 370/252
(58) Field of Classification Search ............. 370/248, 370/228, 256, 230, 278, 222, 285, 235; 709/238
 See application file for complete search history.

(56) References Cited

U.S. PATENT DOCUMENTS

| | | | |
|---|---|---|---|
| 5,790,808 A * | 8/1998 | Seaman ............... 709/223 |
| 6,032,194 A * | 2/2000 | Gai et al. ............. 709/239 |
| 6,202,114 B1 * | 3/2001 | Dutt et al. ............ 710/311 |
| 6,330,229 B1 * | 12/2001 | Jain et al. ............. 370/256 |
| 6,388,995 B1 * | 5/2002 | Gai et al. ............. 370/256 |
| 6,407,985 B1 * | 6/2002 | Jain .................... 370/256 |
| 6,717,922 B2 * | 4/2004 | Hsu et al. ............. 370/258 |
| 7,027,406 B1 * | 4/2006 | Shabtay et al. ........ 370/252 |
| 7,171,504 B2 * | 1/2007 | Ishii ................... 710/305 |
| 7,177,946 B1 * | 2/2007 | Kaluve et al. ......... 709/242 |
| 2001/0021177 A1 * | 9/2001 | Ishii ................... 370/256 |
| 2002/0181413 A1 * | 12/2002 | Kitagawa .............. 370/256 |

\* cited by examiner

*Primary Examiner*—Ricky Ngo
*Assistant Examiner*—DeWanda Samuel

(57) ABSTRACT

The present invention features embodiments of automatically re-enabling a disabled port or physical media interface by monitoring the link status of the physical layer interface. Any change in the link status automatically re-enables a previously disabled port, thereby permitting data coming in through the previously disabled port to be admitted into the switch and automatically forwarded or routed/switched, without the network administrator manually issuing any commands to manually re-enable the port.

1 Claim, 9 Drawing Sheets

PORT RE-ENABLING BY MONITORING LINK STATUS

CROSS-REFERENCE TO RELATED APPLICATIONS

This application claims the benefit of U.S. Provisional Patent Application Ser. No. 60/624,416 filed Nov. 1, 2004, entitled "Port Re-enabling by Monitoring Link Status," which is hereby incorporated by reference herein for all purposes.

FIELD OF INVENTION

The invention generally relates to techniques for automatically enabling media interfaces or ports in switching and/or routing devices. In particular, the invention relates to systems and methods for providing a link status monitoring system within a switching and/or routing device and using such link status to automatically enable a previously disabled or blocked port due to various violations, including security violations.

BACKGROUND

Many switches are available today that provide network administrators the ability to disable or block physical ports. Disabling or turning off ports generally means blocking all network communications on those ports. This is done to protect the network from interruption of service because of unwanted data traffic due to security or policy violations coming in from those ports. These violations may include virus attacks, excessive ping requests, excessive number of incoming packets with an Internet Protocol (IP) address not associated with the particular port's subnet, address resolution protocol (ARP) data units destined for another switching or routing device, and protocol data units (PDUs) that exceed bandwidth restrictions or other network thresholds.

These disabled ports, however, are not disabled permanently. If the violations or the criteria guiding the disabling of these ports are corrected or no longer exist, these ports are enabled and used for network ingress and egress traffic.

To enable these disabled ports, however, a network administrator has to identify the port identification number of each disabled port, as well as the particular switching/routing device of each of these ports. The administrator, furthermore, has to manually issue a set of commands to the switching/routing device to enable these ports. This process is very cumbersome, labor intensive, and time consuming, particularly when the administrator is managing a large network.

There is therefore a need for a mechanism to obviate the need to manually enable ports and thereby unburden the administrator. The present invention solves this need.

SUMMARY

The present invention features embodiments of automatically re-enabling a disabled port or physical media interface by monitoring the link status of the physical layer interface. Any change in the link status automatically re-enables a previously disabled port, thereby permitting data coming in through the previously disabled port to be admitted into the switch and automatically forwarded or routed/switched, without the network administrator manually issuing any commands to manually re-enable the port.

In the first embodiment, the present invention provides a forwarding device comprising one or more physical layer interfaces, one or more data link layer controllers, and a switching/routing module. These physical layer interfaces receive data coming from a communication network. The data link layer controller comprises one or more media access controller (MAC) ports, port indicators, and at least one MAC processor. The data link layer controller, based on the values contained in the port indicators drops or admits the data base on the link status determined by the physical layer interface. The switching/routing module, on the other hand, is adapted to forward these data units forwarded by the data link layer controller.

In another embodiment, the present invention provides for a method of automatically unblocking a previously blocked port in a forwarding device. The blocked port is associated with a block-port indicator that indicates whether the blocked port is blocked or not. The method comprises the steps of receiving data units via a physical layer interface associated with the blocked port; monitoring the link status with the physical layer interface; automatically resetting the block-port indicator when there is a change in the monitored link status; and admitting the incoming data units when the block-port indicator indicates unblocked. This method may further include the additional steps of receiving one or more network policies in effect within the network; setting the block-port indicator; and dropping the data units when the block-port indicator indicates blocked.

In another embodiment, the present invention provides for a forwarding device comprising one or more physical layer interfaces adapted to receive one or more data units from a communication network, one or more data link layer controllers, and a forwarding module operatively coupled to the one or more data link layer controllers. Each data link layer controller comprises one or more media access controller (MAC) ports, each MAC port adapted to be operatively coupled to the one or more physical layer interfaces; one or more port indicators, wherein each port indicator is associated with one of the MAC ports and each port indicator adapted to indicate whether the associated MAC port is blocked or unblocked; and at least one MAC processor, operatively coupled to the one or more MAC ports, adapted to read the one or more port indicators and adapted to select from dropping and admitting the received one or more data units from the one or more physical layer interfaces based on the one or more port indicators. The forwarding module adapted to receive the one or more data units admitted by the one or more data link layer controllers and adapted to forward the one or more data units received from the data link layer controllers.

BRIEF DESCRIPTION OF THE DRAWINGS

The present invention is illustrated by way of example and not limitation in the figures of the accompanying drawings, and in which.

DETAILED DESCRIPTION

Figure 1:
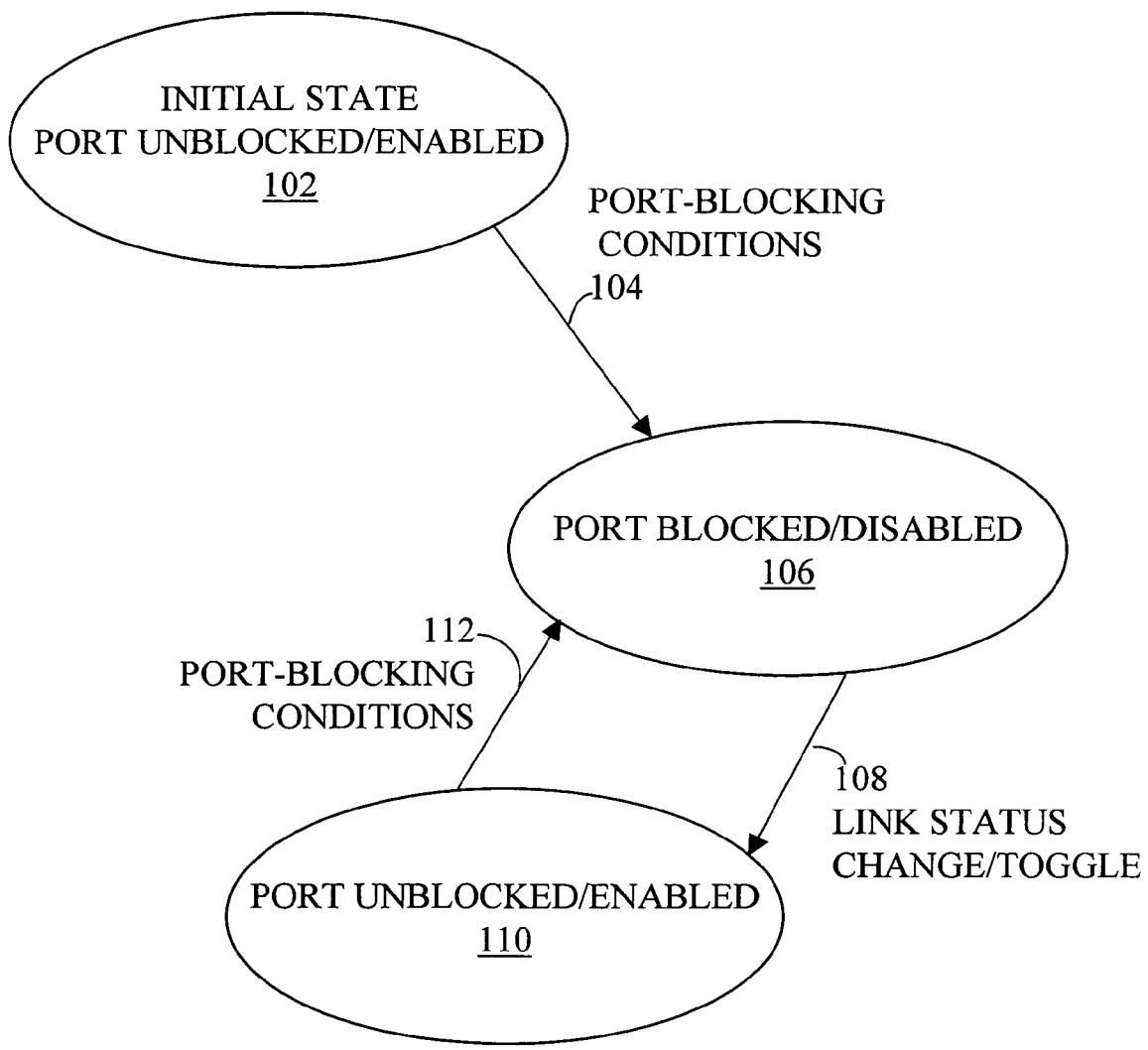
FIG. 1 is a high-level state transition diagram of a port, according to an embodiment of the present invention.

The following detailed description illustrates the invention, by way of example not by way of limitation of the principles of the invention in a fashion that clearly enables one skilled in the art to make and use the invention, and describes several embodiments, adaptations, variations, alternatives and uses of the invention, including what is presently believed to be the best mode of carrying out the invention.

To better understand the figures, like-numbered reference numerals in various figures and descriptions are used in the following description to refer to the same or similar structures, actions, operations, or process steps. In addition, reference numerals within the one hundred series, for example, 102 and 104, are initially introduced in FIG. 1, reference numerals in the two hundred series, for example, 222 and 224, are initially introduced in FIG. 2, and so on and so forth. So, reference numerals in the nine hundred series, e.g., 920 and 940, are initially introduced in FIG. 9.

In general, an embodiment of the invention includes determining if certain port-disabling conditions exist for a particular port. If any of such conditions exists, the port is automatically or manually disabled, thereby preventing the further admission into the switching device and well as the forwarding or transmission of the received data units outside of the switching or forwarding device. If the link status of this particular port, however, changed from link up to link down, this port is automatically enabled thereby enabling transmission of received data units so long as no disabling conditions exist. The toggling of the link status thus triggers the re-enabling of the port without further network administrator intervention. A network administrator, thus, does not need to determine which port is blocked or which device contains the blocked port, or even issue commands to reactivate the previously disabled port.

FIG. 1 is a high-level state diagram showing the various states of a port, in accordance with an embodiment of the invention. In the initial state, generally during system boot-up, the port is enabled or unblocked 102. If any port-blocking conditions 104, however, exist, the port is disabled or blocked 106. Whenever there is a link-status change or toggle 108—particularly from link up to link down, or link down to up—a blocked port 106 becomes unblocked or is enabled again 110. Whenever any port-blocking conditions are encountered 112, the unblocked port 110 then becomes blocked or disabled 106.

Figure 2:
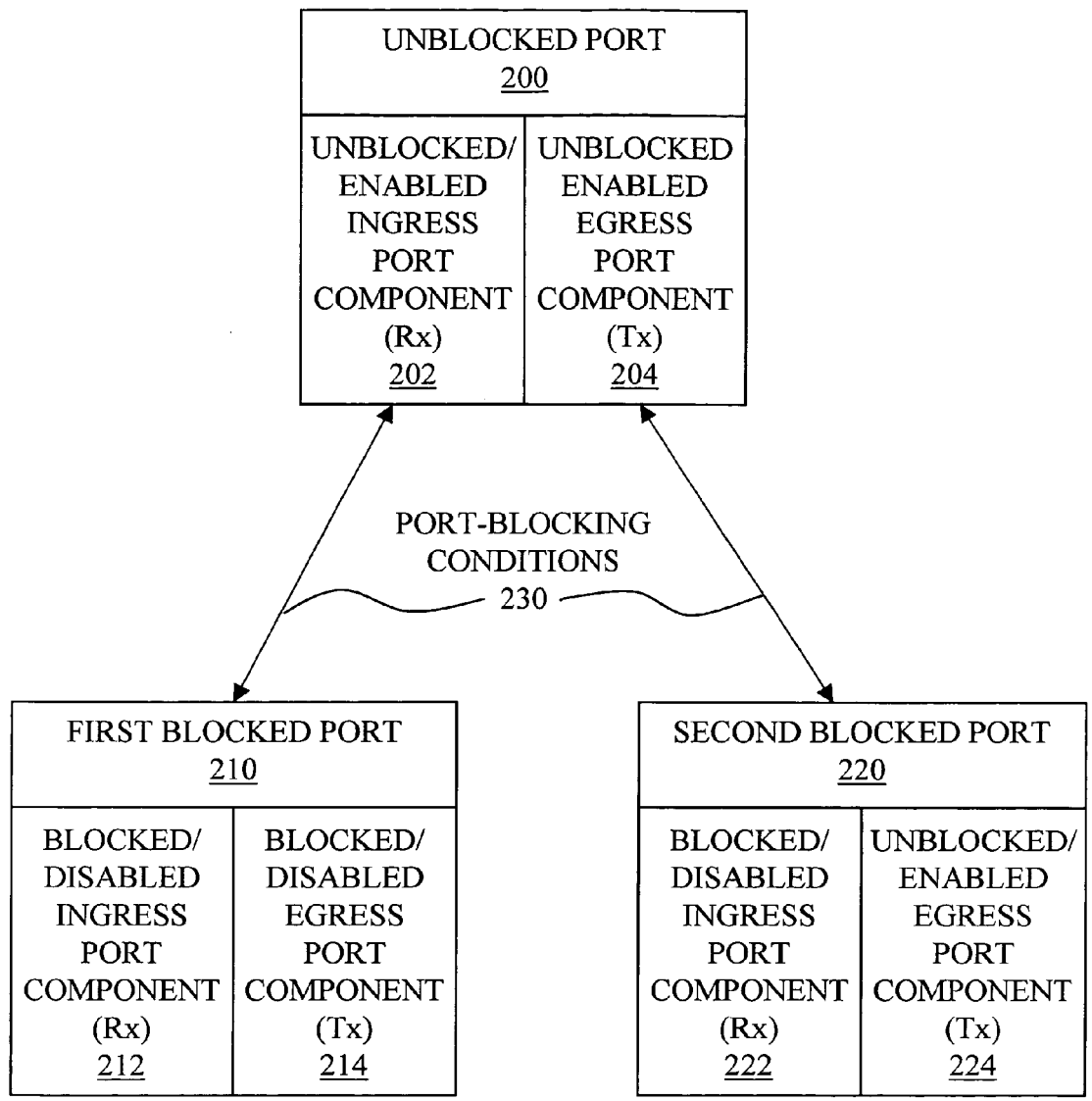
FIG. 2 is a high-level block diagram showing an unblocked port and two blocked ports, according to embodiments of the present invention.

FIG. 2 is a high-level block diagram of a preferred duplex port in accordance with an embodiment of the invention. In the preferred embodiment, the duplex port has two components—a receiving part called the ingress port component and the outgoing part called the egress port component. In the preferred embodiment, an unblocked port 200 has an ingress component in an unblocked state referred to herein as an unblocked ingress component 202, and an egress component in an unblocked state referred to herein as an unblocked egress component 204.

A first blocked port 210, on the other hand, has an ingress component in the blocked or disabled state referred to herein as a blocked ingress component 212. This embodiment operates such that a protocol data unit (PDU) transmitted to the blocked ingress port component is received by the physical interface layer or layer one (PHY) but not admitted further into the switching device. The layers discussed herein refer to the seven layers of the Open Systems Interconnection (OSI) reference model. If an egress port component 214 is blocked, it may not be used to forward outgoing PDUs. If it is unblocked or enabled, however, it may be used to further forward outgoing PDUs.

In the preferred embodiment, a second blocked port 220 has a blocked ingress component 222 and an unblocked egress component 224. In another embodiment, the first blocked port 210 has both the ingress component 212 and the egress component 214 configured to block data. In another embodiment, the port is a non-duplex port, thus, a receiving or incoming port is entirely blocked or unblocked. It is also feasible to have another embodiment of the invention wherein the ingress port component is unblocked while the egress port component is blocked.

Figure 3:
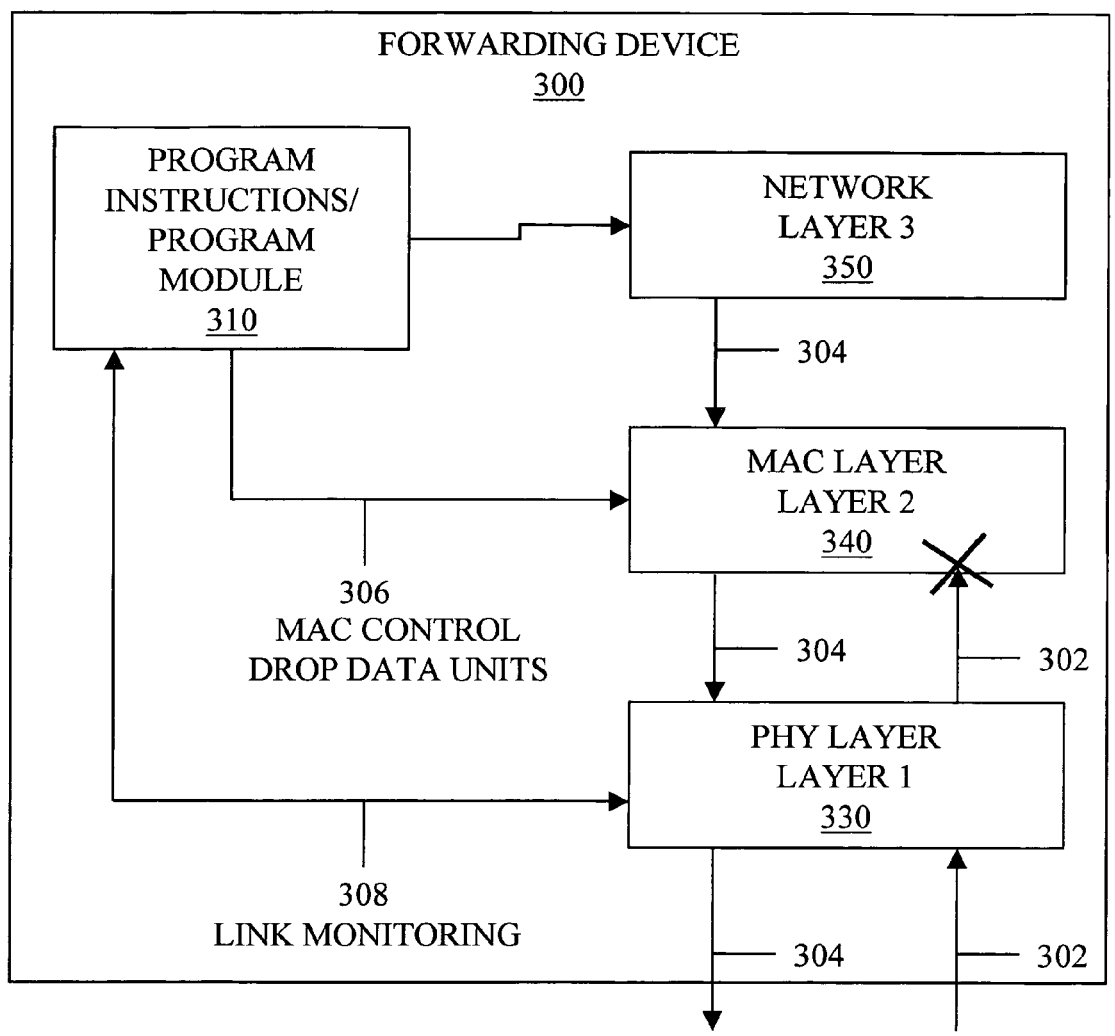
FIG. 3 is a high-level schematic of a forwarding device, according to an embodiment of the present invention.

FIG. 3 is a high-level schematic diagram of a forwarding device 300 with a blocked port in accordance with an embodiment of the invention. In the preferred embodiment, the blocked port only has its ingress port component blocked—the egress component is unblocked, thus allowing outgoing traffic. Incoming or inbound data units 302 are received via the physical layer interface/layer one (PHY) 330, even if the ingress port component is blocked.

The forwarding device 300 of the present invention includes any switches, routers, or any forwarding devices that preferably operate in the multiple layers of the OSI model, including switching in Layer 2 and routing in Layer 3. Each switching or forwarding device 300 of the present invention, moreover, preferably contains a plurality of physical ports 330, preferably operating in the duplex mode.

In some embodiments, the PHY interface 330 is embodied in an integrated circuit chip, e.g., an application-specific integrated circuit (ASIC), incorporating one or more network ports, each port being operatively coupled to a network link. Preferably, the PHY interface 330 is adapted to monitor the associated link state and notify the network administrator when the link is non-operational. With PHY chips, the physical link status generally may not be monitored if the PHY 330 is turned off. Thus, in the preferred embodiment of the invention, the PHY layer 330 is not disabled or turned off even if the port is blocked in accordance with an embodiment of the invention. Rather, the ingress network traffic on the port is blocked preferably at the media access controller (MAC)/Layer 2 level 340, while allowing the physical link PHY 330 to remain active, enabling the embodiment of the present invention to monitor the link status. Thus, the incoming data units 302 are dropped at the Layer 2 or MAC layer 340 and, thus, not further admitted further into the forwarding device 300.

Outgoing data units 304, in the preferred embodiment of the invention, however, may still be forwarded or transmitted from the forwarding device via a port with an egress component in the unblocked state, even if the ingress component is in the blocked state. The outgoing data units 304 are transmitted out of the PHY 330 using the unblocked egress component of the port. This preferred embodiment of the invention, thus, enables a PDU or data unit to be received by the ingress port component at the PHY layer, but not forwarded out of the forwarding device, yet the egress port component of the same port may be utilized to forward outgoing PDUs, which may have been received from other ports (not shown).

The forwarding device 300 of the present invention also preferably includes a set of program instructions or program module 310 that if executed by a processor, preferably a computer processor, controls the network Layer 3 component 350, the MAC layer 340, and the PHY layer 330. The program module 310, for example, controls the MAC layer 306 to drop incoming data units, and monitors 308 the link status of the PHY layer 330. In one embodiment, the program module is embodied in software.

Figure 4:
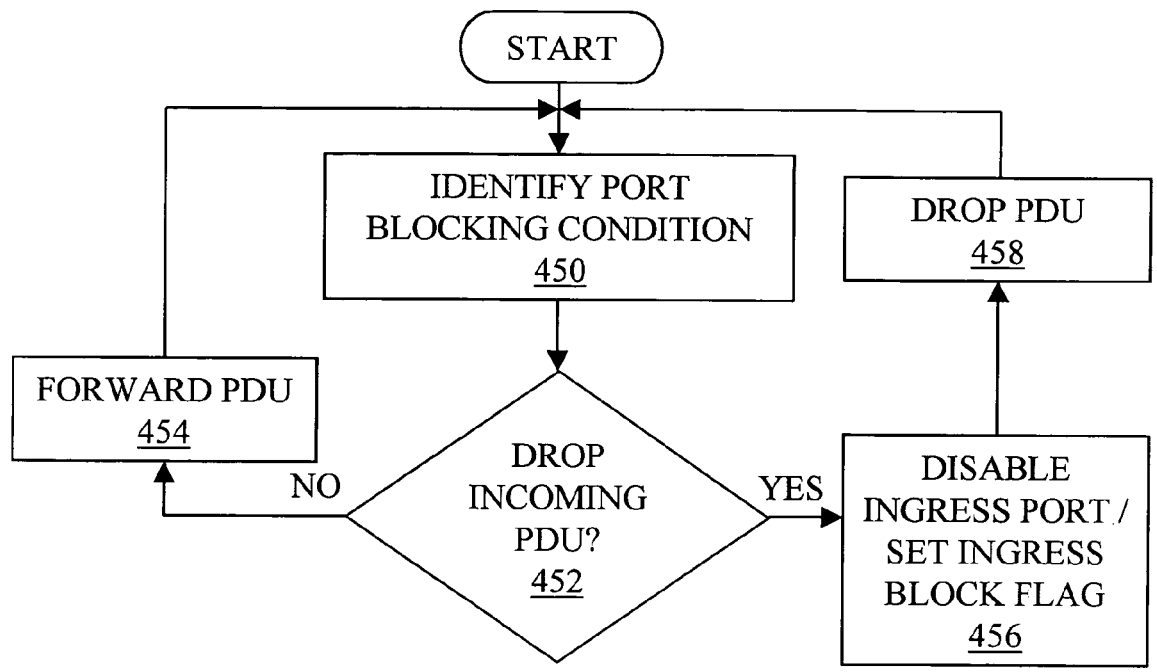
FIG. 4 is a high-level flow chart showing the operations for a blocked port, according to an embodiment of the present invention.

FIG. 4 is a high-level flow chart showing the logical operations of disabling or blocking a port. In the first operation 450, the set of port-blocking conditions is identified. These blocking conditions are related to efficient and effective network utilization, and may be dependent on data traffic threshold, virus attacks, denial of services, broadcast storms, security issues, and other activities that may negatively affect the network.

In one embodiment, the blocking conditions are predefined within the forwarding or switching device 300. Modifications to these predefined conditions, however, are possible. Additional blocking conditions may also be manually defined and incorporated into the device by the network administrator, preferably through a device configuration manager.

After identifying the port-blocking set of conditions (step 450), a decision is made whether the ingress data units or ingress traffic has satisfied one or more blocking conditions and whether the incoming PDUs should be dropped (test 452). If the PDUs are to be admitted into or forwarded from the switching device—meaning they do not meet the blocking condition, the switching device accordingly processes these PDUs or data units and, accordingly if appropriate, forwards (step 454) them out of that device.

If the incoming PDUs are to be blocked, the ingress port component is disabled by using a Boolean flag, a register, or any similar value indicator (step 456). This ingress block flag is set to a value indicating that the port should be block, for example the value "TRUE" or "1." Once the ingress block flag is set (step 456), incoming PDUs are then blocked, meaning PDUs received by the switching device via the disabled ingress port component are not forwarded out from the switching device—they are dropped (step 458). In the preferred embodiment, the egress port component is not disabled and thus may be utilized for outgoing PDUs and, thus, flags for egress port components are unnecessary. Flags, sets of flags, or other value indicators may also be used for simplex (non-duplex) ports.

Figure 5:
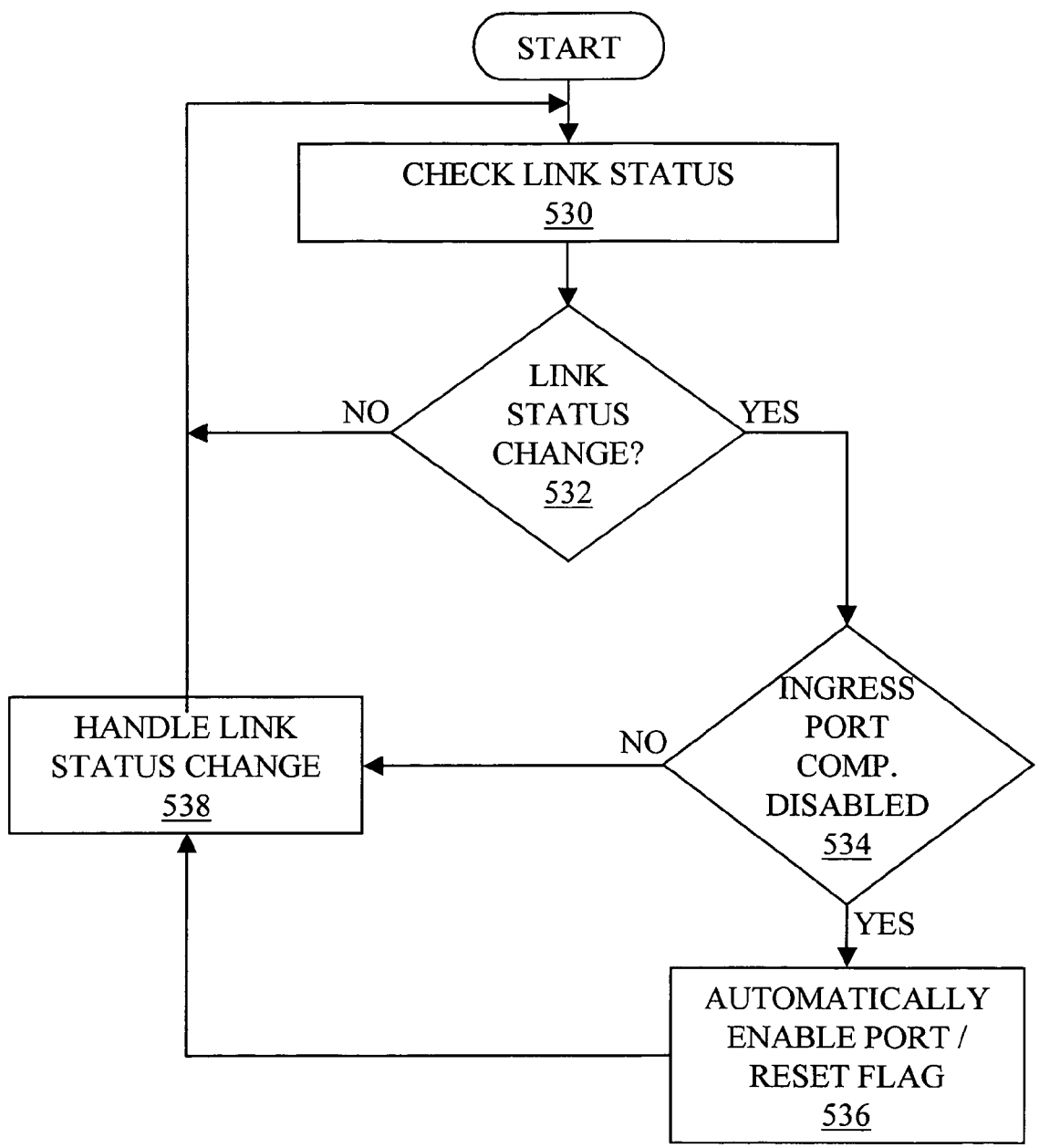
FIG. 5 is a high-level flow chart showing the operations when a link status change occurs, according to an embodiment of the present invention.

FIG. 5 illustrates a high-level flowchart showing how a link status or link state change is used to automatically enable a disabled/blocked port. The link status information of each port may be obtained using a port interface in accordance with Layer 1 (PHY) of the OSI model and through interrupts. Link status information is also preferably continuously monitored. FIG. 5 is illustrated with a preferred blocked port, i.e., the ingress port component is blocked while the egress port component is unblocked.

In the first operation (step 530), the link status/state of the port is checked. If there is no change in the link status (test 532), the link status is then monitored again (step 530). If there is a change, however, in the link status of that port—that is from link up to link down or link down to link up, a determination is then made whether the ingress port component is disabled (test 534). This may be determined by looking at the value of the ingress block flag or any similar indicator. The link status of each port is preferably continuously monitored.

If the ingress port component has been disabled (test 534), by having, for example, a "TRUE" value in the ingress block flag, that ingress port component is automatically re-enabled (step 536) by resetting the ingress block flag, for example, to "FALSE." This operation means that incoming PDUs, via that ingress port component, are now no longer blocked and should be accordingly admitted and processed by the switching device for further forwarding.

In accordance with priori art forwarding devices, a change in link status also initiates status change procedure (step 538) involving one or more functions and duties including, for example, sending a message to an IP address stating that the link for that particular port is down and sending a trap to a simple network protocol manager.

Figure 6:
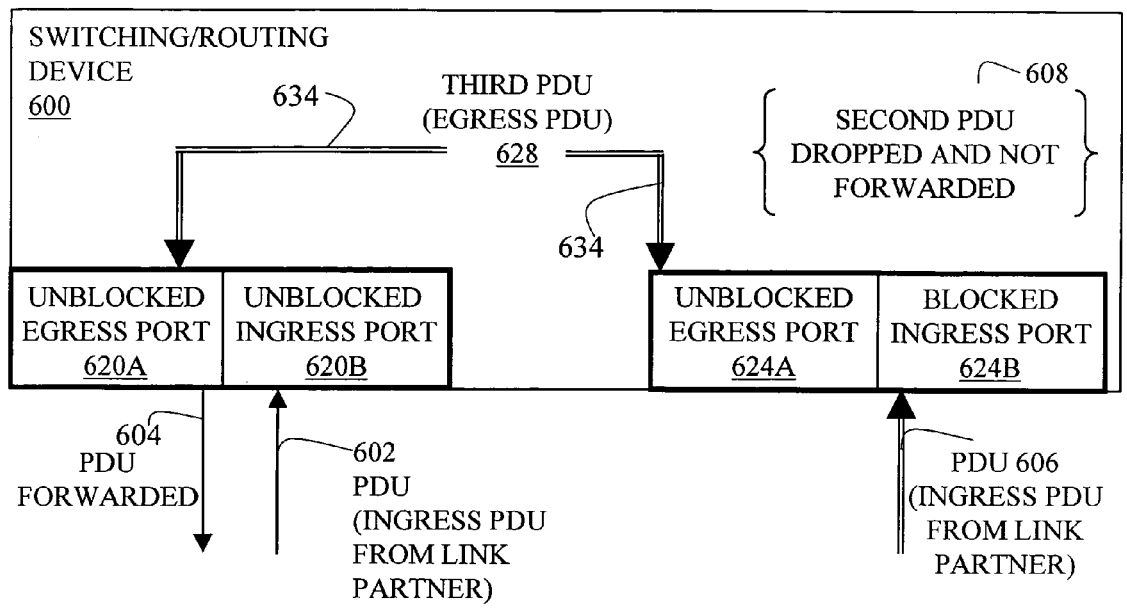
FIG. 6 is a block diagram of a switching/routing device showing how various protocol data units are handled by the device, according to an embodiment of the present invention.

FIG. 6 is a block diagram showing how various PDUs are handled in a forwarding device 600 of the present invention. In the first example, a first inbound PDU 602 is received via the PHY through a duplex port, which has both ingress 620B and egress 620A port components. The ingress port component 620B and egress port component 620A are unblocked/enabled. Because the ingress port component 620B is unblocked, the incoming first ingress PDU 602 is processed by the device 600 and then PDU 604 forwarded out through the egress port component 620A of the same port or other ports.

In another example, a duplex port has a disabled/blocked ingress port component 624B and an enabled/unblocked egress port component 624A. A second inbound PDU 606 using the blocked ingress port component 624B is received through the physical layer of this port. The switch 600, however, drops this second inbound PDU 608, meaning the PDU 608 is not admitted any further into the switch and is not forwarded out from the switch 600.

In another example, a third PDU 628 is received by the device using one of its enabled port components. It could be received via the unblocked ingress port component 620B or any other unblocked port components (not shown). This third PDU 628 may be forwarded 634 outside the switch 600 via the unblocked egress port components 620A, 624A or through any enabled/unblocked egress port component. If an egress port component, however, is blocked or disabled—not shown in the illustration, this blocked egress port component may not be used to forward an outgoing PDU.

Figure 7:
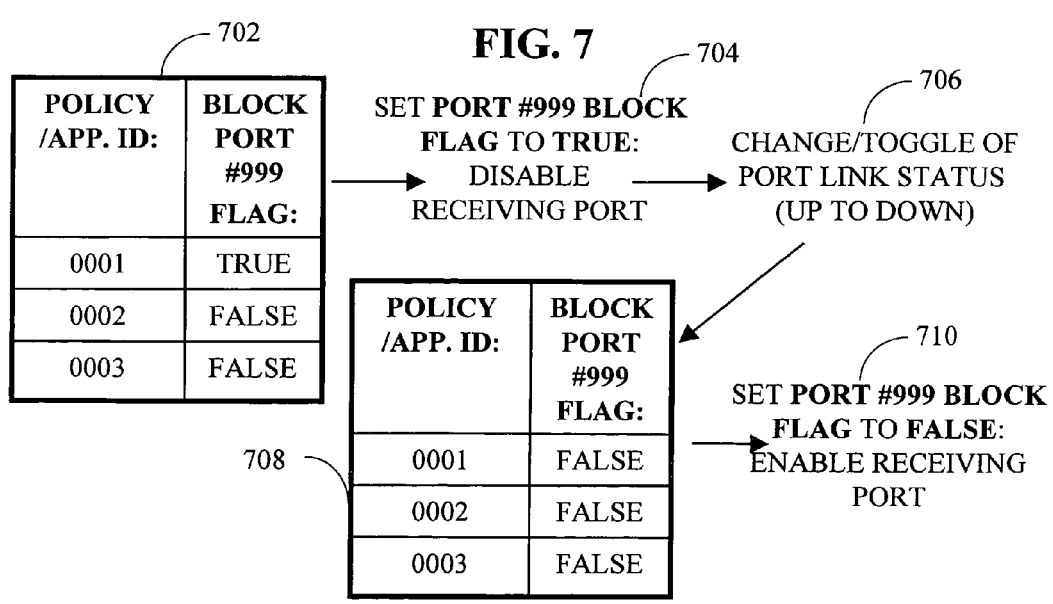
FIG. 7 is a diagram showing the values of flags or indicators indicating whether a particular port should be blocked or not, and how such values are modified when a link status change occurs in accordance with an embodiment of the present invention.

FIG. 7 illustrates the exemplary values of two exemplary port block state tables 702, 708 and flags 704, 710 in an embodiment of the invention. In this example, only the ingress port component of duplex port #999 is disabled—egress port component is enabled.

A number of applications, including policies, including security policies, governing the network, may be in effect within the forwarding device 600, 300. A network threshold criterion, for example, may be identified as Application or Policy ID (identification) "0001." In an embodiment of the invention, each application or policy is identified within the switch 600 using a Policy or Application ID with each policy/application having its own flag indicating whether a particular port, including its ingress, egress, or both port components, should be disabled. A way to indicate which port the block flag relates to or represents is also present, although not shown in the figure.

Depending on the embodiment of the invention, each port in the switch 600 may have its own flag indicating whether that particular port should be enabled or disabled, and, if appropriate, whether just the ingress, egress, or both port components are blocked or unblocked—e.g., port #999: ingress disabled/blocked, egress enabled/unblocked; and port #888: ingress disabled/blocked, disabled/blocked. In the preferred embodiment, this port block flag is one or more registers in Layer 2. One of ordinary skill in the art will realize that there are many ways in indicating such values, for example, through bit manipulation, through "True" and "False" values, and through "0" or "1" values. Other ways to implement this feature may be utilized, for example, via a different data or object structure and array of registers.

It is possible that the policies in effect within the switch 600 may have differing values at any given time. Each policy or application, depending on certain conditions and at various times, may change its request from port blocked to unblocked or vice versa. The first table 702 indicates that Policy "001" requests that port #999, be blocked—indicated by "TRUE." Policies "0002" and "0003", on the other hand, request that port #999 be unblocked—indicated by "FALSE." So long as there is one policy requesting that a port be blocked/disabled, the embodiment of the present invention preferably blocks or disables the ingress port component of that port for all applications and policies. This is done by setting the port block flag, in this case port #999, to "TRUE" 704. This also means that PDUs coming in through this ingress port component should be dropped and not forwarded out of the switching device.

The link status of each port is generally continuously monitored, thus, a change in link status, particularly from link up to down, triggers a change in the value of the flag, i.e., the flag is reset 710 so that the previously disabled port is now enabled. All applications or policies holding flags for that particular port are also reset as shown in the exemplary table 708. An embodiment of the present invention uses this change in link status to automatically re-enable a previously disabled/blocked port and, thus, the received incoming PDUs are now processed so that it may be forwarded out of the forwarding device.

An exemplary pseudo-code showing the high-level logic of FIG. 7 is shown below in TABLE I.

TABLE I

```
// A flag can be set by a link-monitoring module or function
// set aPort->blockFlag = TRUE;
// this module monitors link status, it can be either via an infinite loop
or interrupt driven
void aPortLinkStateMonitor( void )
{
  // initialize
  aPort->blockFlag      = FALSE;
  aPort->aPhyLinkStatus  = LINK_DOWN;
  aPort->aLocalLinkStatus = LINK_DOWN;
  ...    // other appropriate features or operations
  while( 1 ) {
    ...    // other appropriate features or operations
    getLinkStatus(aPort);
    ...    // other appropriate features or operations
    if ( aPort->aPhyLinkStatus == LINK_DOWN ) {
      if ( aPort->aLocalLinkStatus == LINK_UP ) {
        // aPort becomes inactive caused by
        // either unplugged port or reboot a remote end
        aPort->aLocalLinkStatus = LINK_DOWN
        if ( aPort->blockFlag == TRUE ) {
          // flag will be released - reset to FALSE
          aPort->blockFlag = FALSE;
          ...
        }
```

TABLE I-continued

```
      }
    }
    if ( aPort->aPhyLinkStatus == LINK_UP ) {
      if ( aPort->aLocalLinkStatus == LINK_DOWN ) {
        // aPort becomes active
        // the port is plugged or the remote end recovered
        // enable switching port
        setSwitchingPort(aPort, RX, ENABLE);
        ...
      }
    }
  } // _end_of_while
} // _end_of_aPortLinkStateMonitor
// this is a routine which sets/resets the flag (marking port enabled or
disabled) - Port Manager
int aPortBlockIngressFlow ( int appid, int portid, bool block )
{
  // recording for application id trying blocked port
  // get port structure
  aPort = getAPortStructure ( portid );
  // this is valid for active port
  if ( aPort->aLocalLinkStatus == LINK_UP) {
    // if some application holds flag, do not reset the flag
    // because it is possible to have multiple applications hold the flag
    if ( entry(appid) exists ) {
      // it is already called
      return OK;
    }
    addEntry(appid);
    if( block == TRUE ) {
      // disable ingress flow
      setSwitchingPort(aPort, RX, DISABLE);
      // there will be no receiving
      // logically link will be down. let applications, including
management module, know
      reportLinkStatus ( aPort, LINK_DOWN );
      aPort->blockFlag = TRUE;
    }
    else if ( checkEntry( appid ) == TRUE ) {
      removeEntry( appid );
      aPort->blockFlag = FALSE;
    }
  }
  else {
    // as long as the status of link is DOWN
    // let's bypass the routine
    return ERROR;
  }
  return OK;
}
```

Figure 8:
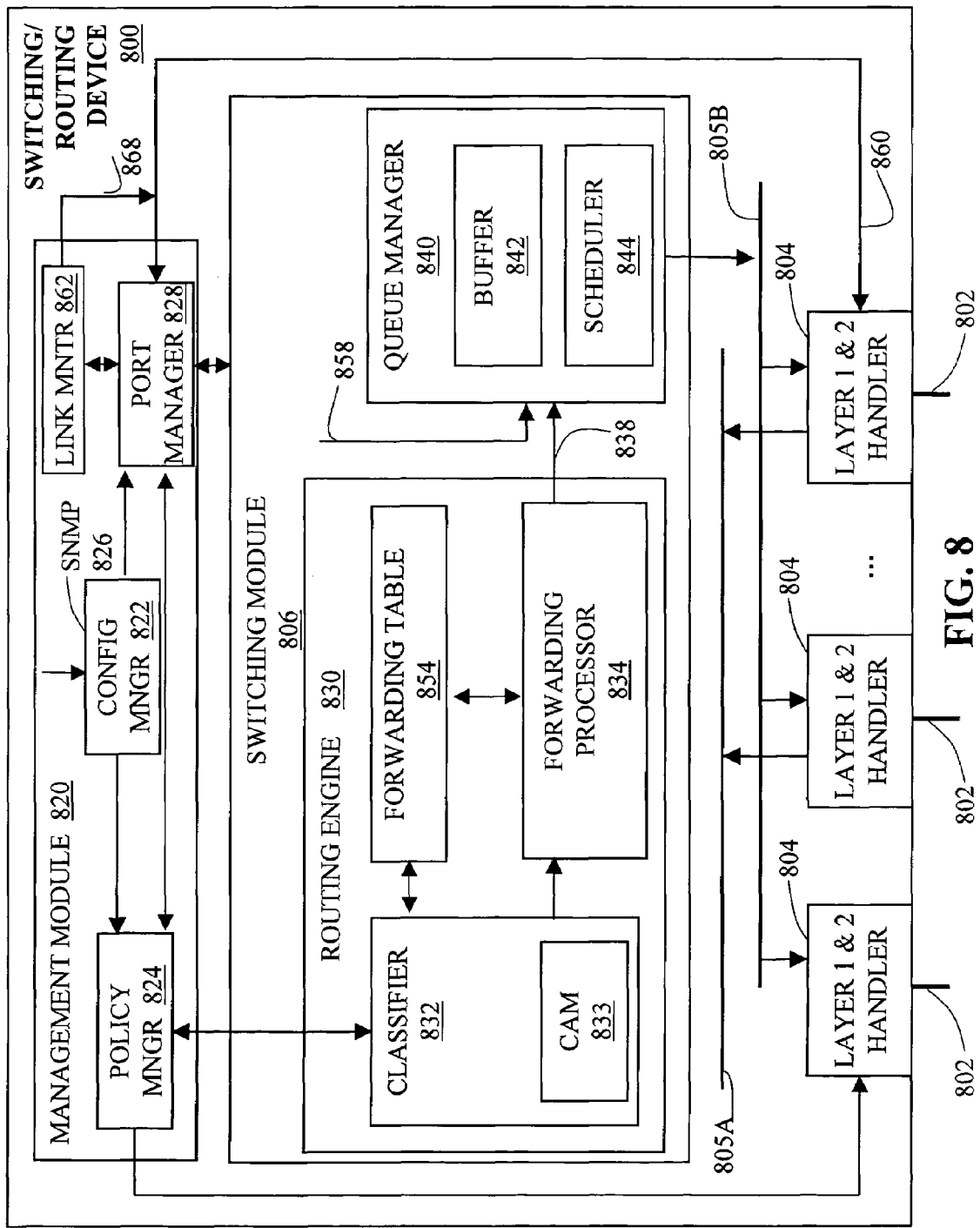
FIG. 8 is a functional block diagram of a multi-layer switch/routing or forwarding device adapted to perform link-status monitoring and port re-enabling operations, according to an embodiment of the present invention.

FIG. 8 is a functional block diagram of a multi-layer switch 800 adapted to perform link-status monitoring and port management of the present invention. The switch 800 of one embodiment comprises one or more OSI Layer 1 and Layer 2 handlers (L1&2Handlers) 804, one or more switching modules 806, and a management module 820, all of which cooperate to receive ingress data traffic and transmit egress data traffic via each of the physical ports 802. For purposes of this embodiment, data flowing into the switch 800 from another network node are herein referred to as ingress data units or protocol data units (PDUs). In contrast, unblocked data propagating internally to a physical port 802 for transmission to another network node is referred to as egress data or outgoing PDUs or data units.

In one embodiment, the ingress or incoming PDUs are conveyed from the plurality of L1&2Handlers 804 to the switching module 806 by means of one or more ingress data buses 805A. Similarly, if the ingress PDUs need to be further transmitted out from the switch 800, they are processed such that they are ready to be transmitted from the switching module 506 to the plurality of L1&2Handlers 504 via one or more egress data buses 805B.

The management module 820 generally comprises a policy manager 824 for retaining and implementing network traffic policies, a configuration manager 822, a link monitor 862, and a port manager 828. The policies or applications implemented by the policy manager 824 are preferably based in part on Layer 2 and/or Layer 3 addressing information derived from source learning operations, route information received from other routing devices, and filtering rules uploaded by the network administrator via a configuration manager 822 using, for example, simple network management protocol (SNMP) messages 826. The traffic/network policies derived from source learning, other network nodes, and the administrator are made available to the routing engine 830 and collectively represented by the forwarding table 854.

The link monitor 862 preferably continuously monitors the link status of each L1&2Handler 804 and is preferably part of the management module 820. In one embodiment of the invention, the link monitor 562 is incorporated into the port manager 528.

There are many ways to change the link status of a port. Let us take for example a MICROSOFT(™) Window-based personal computer (PC) connected to a port, for example, port #999. The link state can be changed by simply unplugging the network cable from the network wall jack or from the connector on the network interface card of the PC. Simply rebooting the PC or powering it off and on again toggles the link status from link up to link down, and from link down to link up. If the link state is changed/toggled—link up status to link down status or link down to link up, the link monitor 862 detects such change, and accordingly notifies the port manager 828 to enable that particular port associated with that link. By using the change in link status, a port can easily be re-enabled. Users, for example, may re-enable their ports by simply rebooting their systems or by simply unplugging and re-plugging their network cables back to their network connections. Network administration intervention is thus alleviated.

This link monitor 862 communicates with the port manager 828, which accordingly identifies and sets the appropriate, preferably, duplex ports—whether ingress, egress, or both port components—as enabled/unblocked or disabled/blocked. The port manager 828 also resets the application or policy block flags or communicates this information to the policy manager 824, which in turn, resets the appropriate applications or policies. In the preferred embodiment, the port manager 828 communicates with the L1&2Handlers and sets/resets the appropriate control registers—Rx and Tx—that indicate whether a port, including the corresponding ingress and egress port components, should be blocked or not. Thus, the preferred dropping of incoming data units are handled in the L1&2Handlers.

The switch 800 preferably comprises at least one switching module 806 capable of, but not limited to, Layer 2 (data Link) and Layer 3 (network) switching operations. The set of possible Layer 2 protocols for operably coupling the ports 802 to a wired and/or wireless communications link include the Institute of Electrical and Electronics Engineers (IEEE) 802.3 and IEEE 802.11 standards, while the set of possible Layer 3 protocols includes Internet Protocol (IP) version 4 defined in Internet Engineering Task Force (IETF) Request for Comment (RFC) 791 and IP version 6 defined in IETF RFC 1883.

The switching module 806 preferably comprises a routing engine 830, a forwarding table 854, and a queue manager 840. The routing engine 830, in turn, comprises a classifier 832 that receives ingress PDUs from the data bus 805A, inspects one or more fields of the PDUs, and classifies the PDUs into one of a plurality of flows using a content addressable memory 833. In one embodiment, the management module 820, particularly with the port manager 828, instructs or coordinates with the switching module 806 to implement the blocking and dropping features of the present invention. In this embodiment, the routing engine 830 drops the incoming data units coming from a blocked port. If the PDUs are not to be dropped—admitted, however, the routing engine 830 further retrieves forwarding information from the forwarding table 854 retained in high-speed memory. The forwarding information retrieved from the forwarding table 854 preferably includes, but is not limited to, a flow identifier used to specify those forwarding operations necessary to prepare the particular appropriate PDU for egress, for example.

The forwarding processor 834 receives the unblocked ingress PDUs with the associated forwarding information and executes one or more forwarding operations prior to transmission to the appropriate egress port components. In another embodiment, the dropping of the blocked ingress data units coming through a disabled port is handled in this processor 834.

For those egress data units that are to be transmitted, the forwarding operations preferably include but are not limited to header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, authentication for selectively filtering PDUs, access control, higher-layer learning including Address Resolution Protocol (ARP) control, source learning, and class of service (CoS) for determining the relative priority with which PDUs are allocated switch resources.

After the forwarding processor 834, the PDUs are passed to and stored in the queue manager 840 until bandwidth is available to transmit the PDUs to the appropriate egress port component. In particular, the egress PDUs are buffered in one or more priority queues in the buffer 842 until they are transmitted by the scheduler 844 to the appropriate egress port component 802 via the output data bus 805B.

Figure 9:
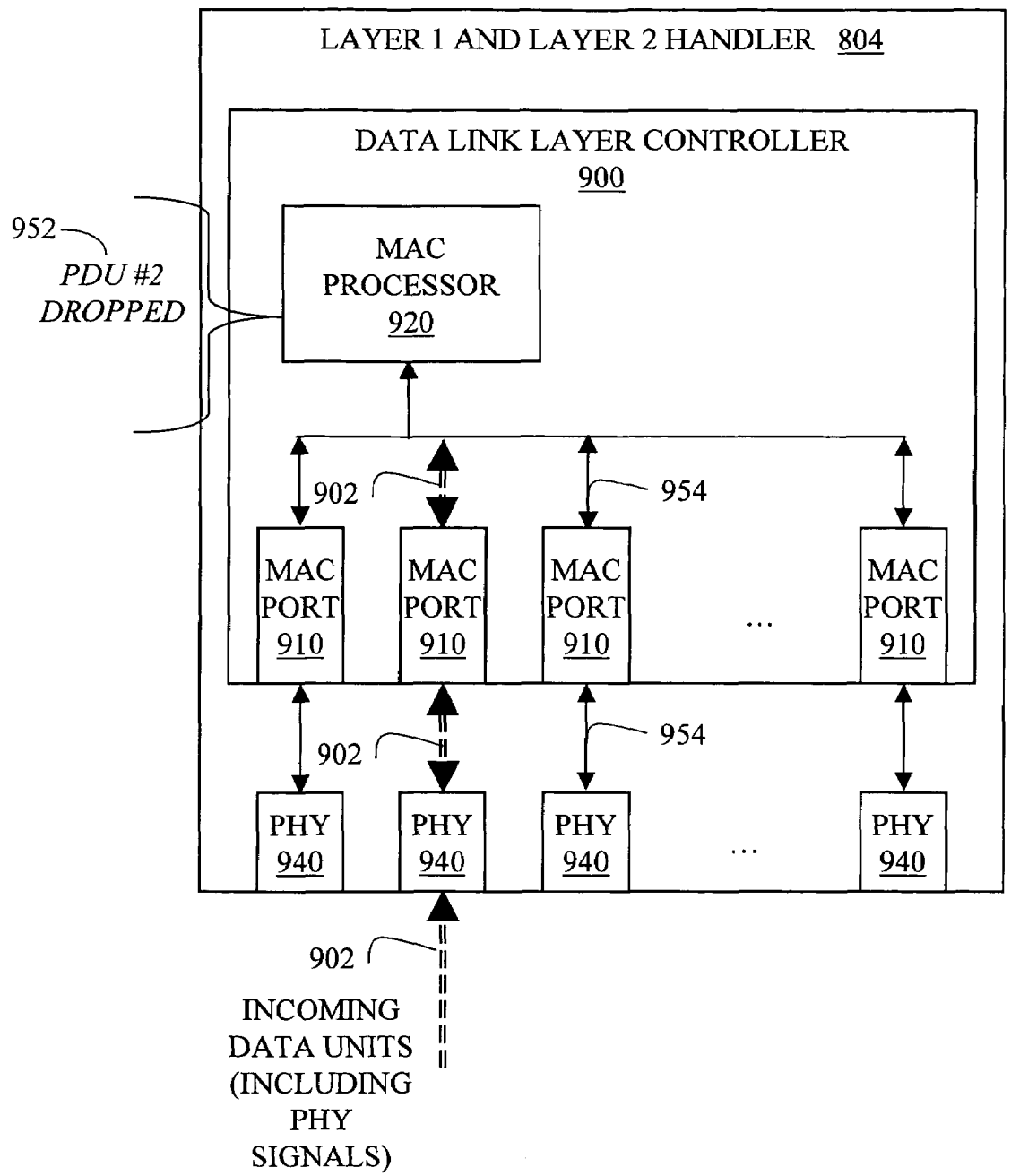
FIG. 9 is a high-level schematic of a Layer 1 and Layer 2 handler or module, according to the preferred embodiment of the present invention.

FIG. 9 is a functional block diagram of a preferred L1&2Handler of 804 of the present invention. In this preferred embodiment, an L1&2Handler 804 generally comprises a plurality of physical layer interfaces (PHY) 940 and media access control (MAC) interfaces adapted to exchange PDUs, e.g., Ethernet frames, via network communications links. The L1&2Handler also preferably includes at least one data link layer controller 900. Each of the PHYs 940 operating at the physical layer performs conventional network interface functions including the reception and transmission of PDUs, such as Ethernet symbol streams.

When receiving an ingress PDU 902 from the associated communications link, electrical or optical signals from the communications link are converted by the PHY 940 to a byte stream, which is then transmitted to an associated MAC media interface/port 910. In the transmit mode, the PHY 940 converts a byte stream from an associated MAC port 910 into the electrical or optical signal appropriate for the medium. The PHY 940 is particular to the type of medium to which it is connected.

The data link layer controller 900 in the preferred embodiment comprises one or more MAC ports/interfaces 910. Each of the plurality of ports 910 is preferably a duplex port adapted to receive ingress data and transmit egress data. The MAC ports 910, operating at layer two, perform conventional network interface functions including the reception and transmission of Ethernet frames. In reception mode, the MAC ports 910 preferably perform various functions including, but not limited to: (a) MAC frame parsing for extracting, for example, from the Ethernet Type/Length field, the encapsulated protocol type, the frame priority, the user priority of VLAN tagged frames, and the TOS byte of IP frames with precedence or DiffServ mapping; (b) error checking using the frame check sequence (FCS) value of received data as well as packet decapsulation; and (c) asymmetric and symmetric flow control including the acceptance of flow control frames to discontinue frame transmission or pause frame transmission by a network neighbor, for example. Frames from the MAC ports 910 then undergo local processing at the MAC processor 920. The dropping of ingress PDUs received through a blocked port 952, in accordance with the features of the invention, is preferably done by the MAC processor 920.

Consistent with conventional media access controllers, the MAC ports 910 perform various functions including: (a) collision handling, (b) access control to the communications medium in accordance with the CSMA/CD transmission protocol, (c) frame check sequence (FCS) value generation, (d) encapsulation, and (e) transmit deferral, for example. In the preferred embodiment, the MAC ports 910 are adapted to independently support either 10, 100, or 1000 megabit per second throughput using Reduced Ten-Bit Interface (RTBI) or Reduced Gigabit Media Independent Interface (RGMII) types of interfaces.

Figure 10:
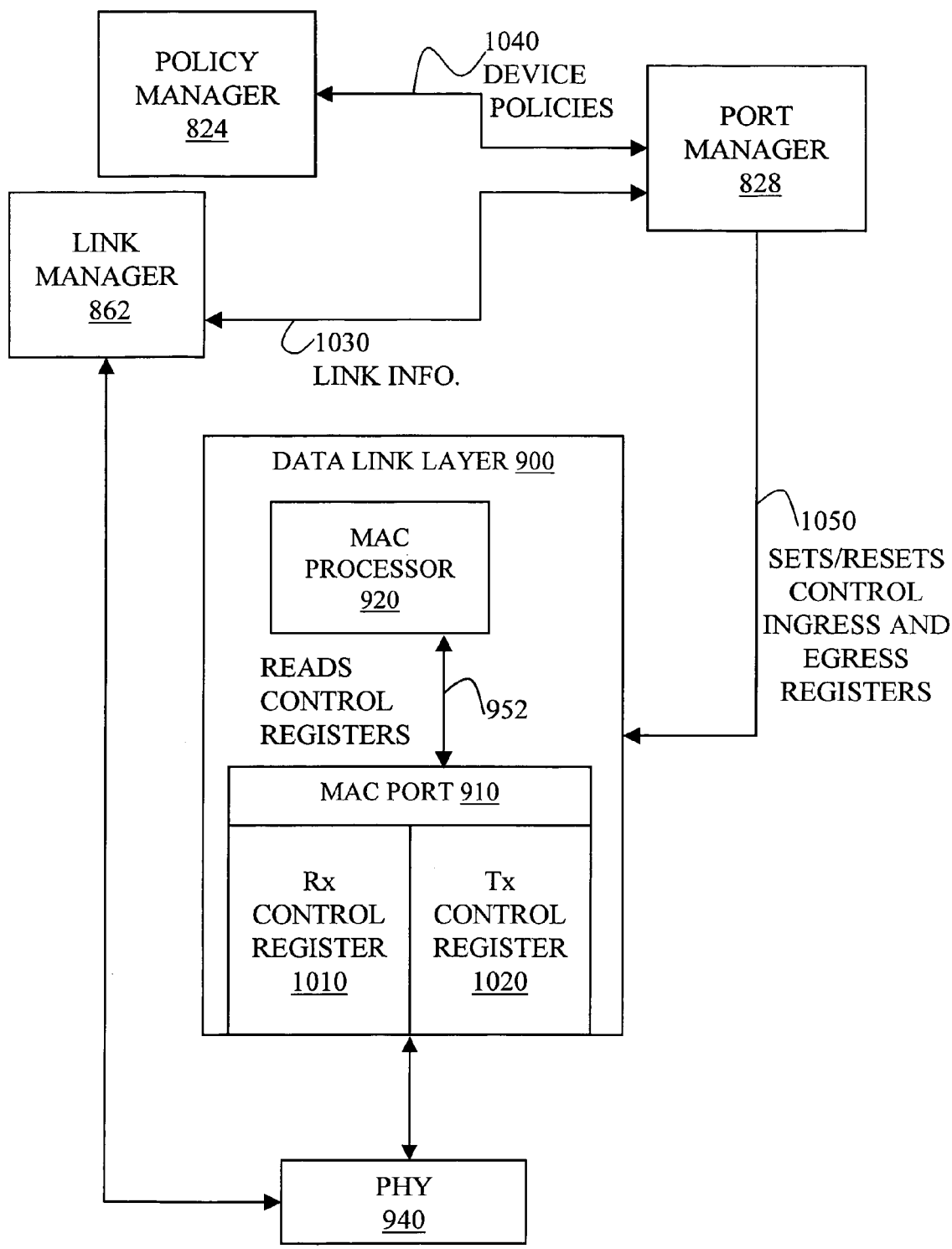
FIG. 10 is a high-level functional block diagram showing the interaction of various modules and components, according to an embodiment of the present invention.

FIG. 10 is a high-level functional block diagram illustrating in general how the features of the present invention may be processed. This figure also shows the data link layer controller 900, although only some portions of it, in more detail. A MAC Port 910 in the preferred embodiment contains or is associated with two control registers: the reception (Rx) control register 1010 and the transmission (Tx) control register 1020. The Rx control register 1010 and the Tx control register 1020 are the flags indicating whether the ingress and egress port component, respectively, should be blocked or not. These registers are preferably set and reset 1050 by the port manager 828.

The policy manager 824 communicates with the port manager 828 thereby providing the port manager 828 the various applications or policies 1040 in effect in the forwarding device of the present invention. The application or policies flags, described above, may be stored in the policy manager, but is preferably stored and maintained by the port manager 828.

The link manager 862 communicates with the port manager 828, providing the port manager 828 the link information 1030 for each of the PHY 940. In one example, the PHY is a Gigabit Interface Converter (GBIC). The link manager 862 also provides the port manager the information for it to decide whether to set or reset the control registers 1010, 1020 in Layer 2/Mac port 910.

In the preferred embodiment, the MAC processor 920 reads the value or values 952 contained in the control registers—Rx control register 1010 and Rx control register 1020. If the value or values indicate that the ingress port component of the port should be blocked, the MAC processor 920 drops or does not admit the incoming/ingress data units coming from that port 910, i.e., the incoming data units are not processed for further transmission out of the forwarding device. On the other hand, if the value indicates that the incoming data units coming in through that port 910 should be processed, the MAC processor 920 processes the data units for further transmission As discussed above, a MAC port 910 whose ingress port component is disabled may still transmit out of its egress port component, if such egress port component is not blocked in accordance with the present invention.

The MAC layer or Layer 2 thus communicates with the PHY or Layer 1. The MAC layer/Layer 2 in turn communicates with the Layer 3 or network layer. The management module, including the policy manager, port manager, and link manager, may be part of Layer 3 or part of one of the upper layers of the OSI model.

The present invention has been described above in terms of a presently preferred embodiment so that an understanding of the present invention can be conveyed. There are, however, many configurations for switches, forwarding devices, link monitor modules, port manager modules, port-block flags, and policy flags of the present invention not specifically described herein but with which the present invention is applicable. The present invention should therefore not be seen as limited to the particular embodiments described herein, but rather, it should be understood that the present invention has wide applicability with respect, for example, to switches, link monitoring modules, port managers, and flags generally. For example, how the port components, ingress and egress, are identified within the switch as disabled or enabled may be implemented in other ways not explicitly discussed herein. For example, their values may be stored or handled not in the management module itself, but rather within the switch module itself. Another variation is that the functions of the link manager are incorporated as part of the port manager in a software program, preferably stored in a computer-readable medium and executable by a computer to perform the inventive steps of the present invention. The present features of the invention may also be implemented in hardware, software, or in both (firmware). Variations on where to drop ingress data as shown can be done in another layer, for example, layer 3. Wireless ports may also be used.

All modifications, variations, or equivalent arrangements and implementations that are within the scope of the attached claims should therefore be considered within the scope of the invention.

We claim:

1. A method of automatically unblocking a blocked port in a forwarding device for operatively coupling to a communication network, the blocked port associated with a block-port indicator adapted to indicate whether the blocked port is blocked or unblocked, the method comprising the steps of:

receiving one or more data units from an interface associated with the blocked port;

monitoring a link status of the interface;

resetting the block-port indicator to indicate unblocked, when there is a change in the monitored link status;

admitting the one or more data units received from the interface when the associated block-port indicator indicates unblocked;

receiving one or more policies of the communication network;

setting the block-port indicator to indicate a blocked port based on the received one or more policies;

dropping the one or more data units received from the interface when the block-port indicator indicates a blocked port; and wherein the resetting step is resetting an ingress indicator of the block-port indicator and the setting step is setting the ingress indicator of the block-port indicator.

* * * * *